United States Patent [19]

Miyanaga

[11] Patent Number: 4,727,507

[45] Date of Patent: Feb. 23, 1988

[54] MULTIPLICATION CIRCUIT USING A MULTIPLIER AND A CARRY PROPAGATING ADDER

[75] Inventor: Hideo Miyanaga, Kawasaki, Japan

[73] Assignee: Fujitsu Limited, Kanagawa, Japan

[21] Appl. No.: 685,517

[22] Filed: Dec. 24, 1984

[30] Foreign Application Priority Data

Dec. 26, 1983 [JP] Japan ............................. 58-247392
Dec. 27, 1983 [JP] Japan ............................. 58-251924
Feb. 10, 1984 [JP] Japan ............................. 59-024135

[51] Int. Cl.$^4$ ............................................. G06F 7/52
[52] U.S. Cl. ................................................... 364/760
[58] Field of Search .............................. 364/759, 760

[56] References Cited

U.S. PATENT DOCUMENTS 3,840,727 10/1974 Amdahl et al. ...................... 364/760
4,041,292 8/1977 Kindell .............................. 364/760

OTHER PUBLICATIONS

Wallace, "A Suggestion for a Fast Multiplier" *IEEE Trans. on Electronic Computers* Feb. 1964, pp. 14–17.
Saunders, "High-Speed Multiplier" *IBM Tech. Disclosure Bulletin* vol. 13, No. 2, Jul. 1970, pp. 546–548.
Singh, "Multiplier Decoder" *IBM Tech. Disclosure Bulletin* vol. 18, No. 12, May 1976, pp. 4107–4108.
Shen et al "Elimination of Spill Adderin High-Speed Multiplier" *IBM Tech. Disclosure Bulletin* vol. 24, No. 3, Aug. 1981, pp. 1397–1399.

*Primary Examiner*—David H. Malzahn
*Attorney, Agent, or Firm*—Armstrong, Nikaido, Marmelstein & Kubovcik

[57] ABSTRACT

A multiplication circuit used for a high speed multiplier in a computer system is basically constituted by a multiplier and a carry propagating adder. The multiplier obtains a sum and carry per each bit by using carry save adder trees having a plurality of carry save adders, and generates a carry generation function and a carry propagation function based on the sum and carry by using a generation/propagation unit. The carry propagating adder obtains a final product based on the carry generation function and carry propagation function, and the carry generation function and carry propagation function generated by the generation/propagation unit are fed back to a final stage of the carry save adder.

10 Claims, 14 Drawing Figures

MULTIPLICATION CIRCUIT USING A MULTIPLIER AND A CARRY PROPAGATING ADDER

BACKGROUND OF THE INVENTION

1. Field of the Invention

The present invention is related to a multiplication circuit used for a high speed multiplier in a computer system.

2. Description of the Related Art

As is well known, multiplication of binary numbers is performed by repeating addition and carry in the multiplier of the computer system. Also, as is well known, there are two methods of binary number multiplication, i.e., one, a parallel arithmetic method using an array circuit arrangement; and two, a carry save adder (CSA) tree method using a plurality of carry save adders, each connected branchwise.

In the CSA three method, many gate circuits are used for performing multiplication in the CSA trees. However, the more gate circuits included, the longer the operation time, so that high speed operation is impeded in the multiplication circuit. This problem is explained in detail hereinafter.

SUMMARY OF THE INVENTION

The primary object of the present invention is to provide a multiplication circuit used for a high speed multiplier in a computer system.

Another object of the present invention is to provide a multiplication circuit using carry save adder trees enabling a reduction in the number of gate circuits.

Still another object of the present invention is a multiplication circuit using carry save adder trees enabling a very precise error check during the operation.

In accordance with the present invention there is provided a multiplication circuit used for a high speed multiplier in a computer system. The multiplication circuit comprises a multiplier and a carry propagating adder. The multiplier obtains a sum and carry per each bit by using carry save adder trees having a plurality of carry save adders. The multiplier generates a carry generation function and a carry propagating function based on the sum and carry obtained by using a generation/propagation unit. The carry propagating adder obtains a final product based on the carry generation function and carry propagation function. According to the present invention, the carry generation function and carry propagation function generated by the generation/propagation unit are fed back to an appropriate stage of the carry save adder.

In accordance with the structure of the present invention, it is possible to reduce the number of gates used in the carry save adder trees and high power output gates used in the multiplier, thereby making it possible to improve the operation speed and precision of an error check in the multiplication circuit.

DESCRIPTION OF THE PREFERRED EMBODIMENTS

Before describing the preferred embodiments, an explanation will be given of a conventional multiplication circuit using the carry save adder (CSA) trees method.

Figure 1:
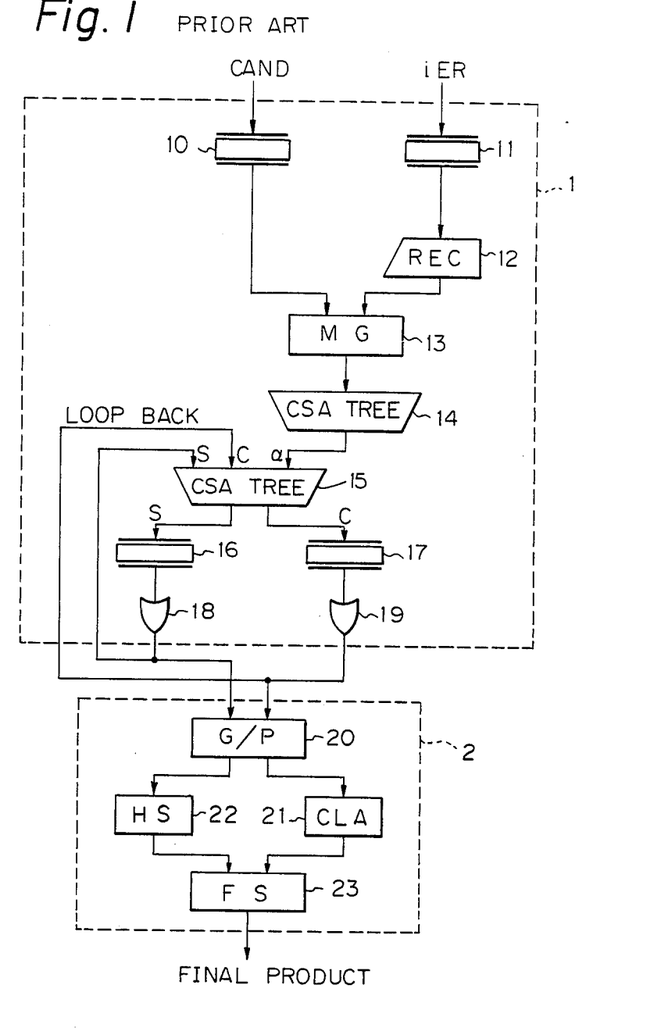
FIG. 1 is a basic block diagram of a conventional multiplication circuit using carry save adder trees.

In FIG. 1, the multiplication circuit is basically constituted by a multiplier 1 and a carry propagating adder 2. The multiplier 1 comprises a register 10 for setting or storing a multiplicand CAND, a register 11 for setting or storing a multiplier factor iER, a recoder 12 for setting or storing the iER, a multiple gate 13 for determining a scale factor based on outputs of the register 10 and the recoder 12, a first stage CSA tree 14 for obtaining the sum and carry based on the output of the multiple gate 13, a final stage CSA tree 15 for obtaining the sum and carry based on the outputs of CSA tree 14 and a loop back of a partial product, a register 16 for setting or storing the sum S of the partial product from the CSA tree 15, a register 17 for setting or storing the carry C of the partial product, an output gate 18 for providing a high power output of the sum, and an output gate 19 for providing a high power output of the carry C. Both outputs from the output gates 18 and 19 are fed back to the CSA tree 15 (so-called loop back).

The carry propagating adder (CPA) 2 comprises a generation/propagation (G/P) unit 20 for generating a carry generation function and a carry propagation function based on the sum S and the carry C transmitted from the output gates 18 and 19, a carry look ahead logic circuit (CLA) 21, a half sum logic circuit (HS) 22, and a full sum logic circuit (FS) 23 for generating a final product based on the outputs from the G/P unit 20.

As is obvious from the drawing, the loop backs of the sum S and the carry C to the CSA tree 15 are performed by the outputs from the gate 18 and 19. However, the structure of the CSA tree 15 is made complex by the use of these loop backs of the sum S and the carry C.

Further, when the multiplier 1 and the carry propagating adder 2 cannot be incorporated on a single LSI chip, the multiplier 1 must be provided with high power output gates 18 and 19 because the gates of the registers 16 and 17 do not provide sufficient power to drive an external terminal. The high power gates 18 and 19, however, take up a large area on the LSI chip, adversely affecting the integration factor of the LSI chip.

Figure 2:
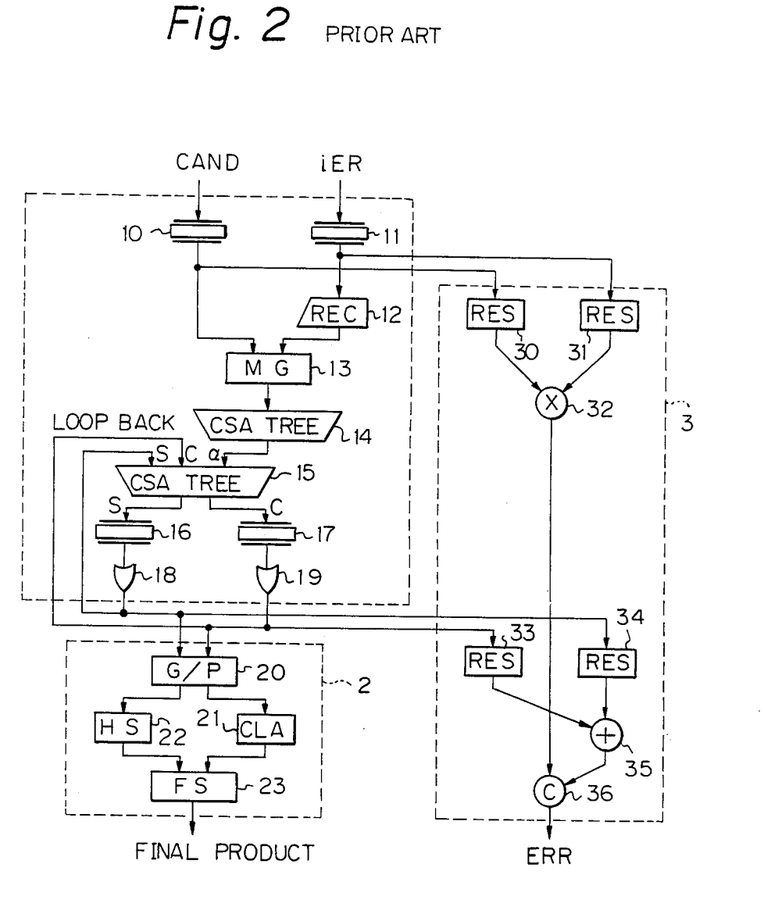
FIG. 2 is a basic block diagram of an error check circuit provided to the multiplication circuit shown in FIG. 1.

In FIG. 2, a conventional error check circuit 3 used in the multiplication circuit is constituted by a residue generator 30 for generating a residue based on the CAND, a residue generator 31 for generating a residue based on the iER, a residue multiplier 32 for multiplying both residues transmitted from both registers 30 and 31, a residue generator 33 for generating a residue based on the carry C, a residue generator 34 for generating a residue based on the sum S, a residue adder 35 for adding both residues transmitted for both residue generators 33 and 34, and a residue comparator 36 for generating an error ERR based on comparison of a residue obtained by the residue multiplier 32 with a residue obtained by the residue adder 35.

As is obvious from the drawing, a conventional error check is performed by comparing the residue obtained from the CAND and the iER with the residue obtained from the sum S and the carry C. However, the structure of the error check circuit is made complex by the use of the residue obtained from the sum S and the carry C.

A multiplication circuit used for a high speed multiplier in a computer system according to the present invention will now be explained.

Figure 3:
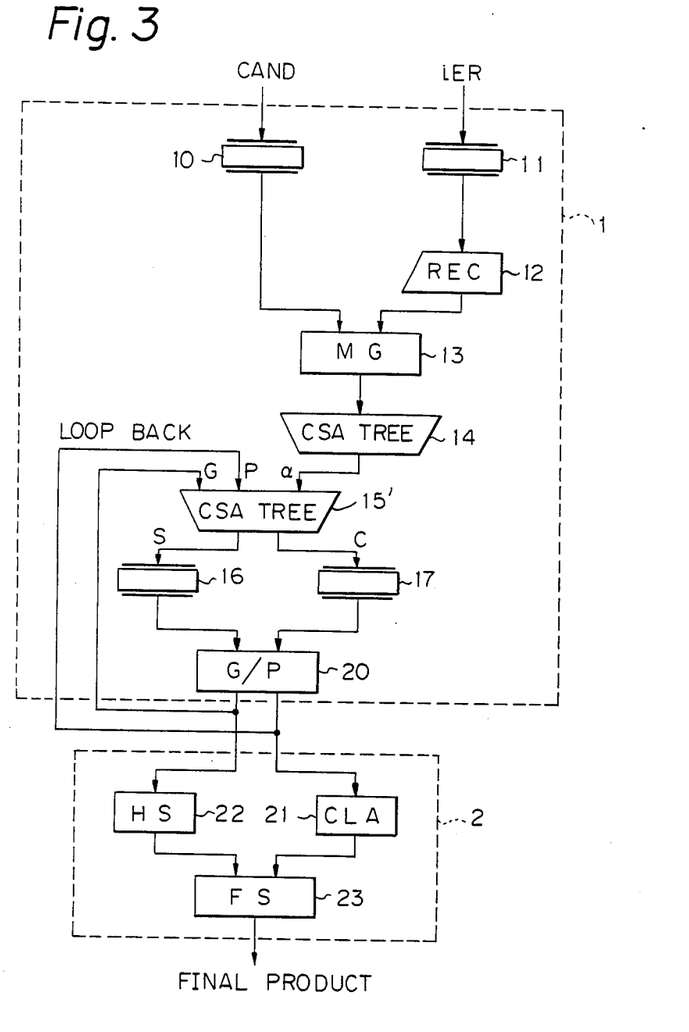
FIG. 3 is a basic block diagram of a multiplication circuit using carry save adder trees according to an embodiment of the present invention.

In FIG. 3, the same components as that of FIG. 1 are referred to by the same reference numerals. The differences between the conventional multiplication circuit and that of the present invention are first, the loop backs to the CSA tree 15' are changed to the generated term $G_i$ and the propagated term $P_i$ obtained by the G/P unit 20, and second, the G/P unit 20 is formed in the LSI chip of the multiplier 1 and is directly driven by both registers 16 and 17, so that both output gates 18 and 19 are eliminated from the multiplier 1.

Figure 4:
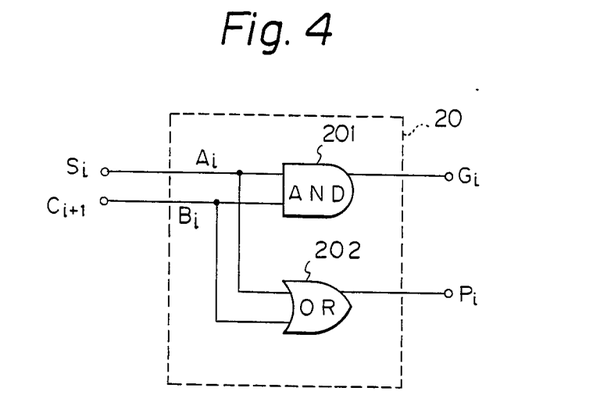
FIG. 4 is a basic circuit diagram of a generation/propagation unit.

The G/P unit 20, in general, is constituted by a plurality of AND gates and OR gates as shown in FIG. 4, only for an "i"th bit for convenience. The relationships between the generated term $G_i$, propagated term $P_i$ and the sum $S_i$ and the carry $C_{i+1}$ are shown by the following formulas.

$$G_i = A_i \cdot B_i \quad (1)$$

$$P_i = A_i + B_i \quad (2)$$

where, $A_i$ and $B_i$ indicate $S_i$ and $C_{i+1}$, and i indicates a bit number.

As is obvious from the formulas (1) and (2), if two inputs $A_i$ and $B_i$ indicate "1", the carry is always generated at the "i" location, so that the generated term $G_i$ is represented by the AND. Meanwhile, if either $A_i$ or $B_i$ indicate "1", the lower rank carry is propagated to the upper rank carry, so that the propagated term $P_i$ is represented by the OR.

Next, the loop back using the generated term $G_i$ and the propagated term $P_i$ according to the present invention are explained below. A number of the gate circuits in the CSA tree 15' are reduced by these loop backs.

Figure 5:
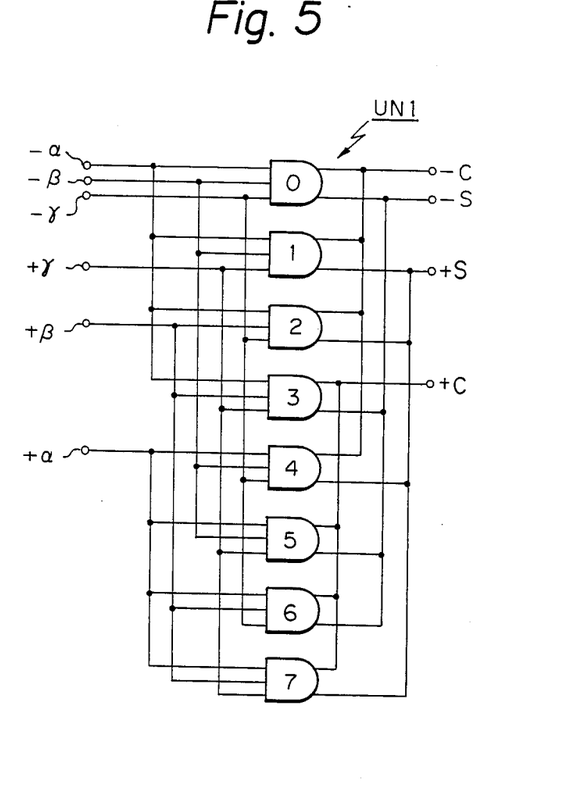
FIG. 5 is a basic circuit diagram of a unit of the CSA tree having eight AND gates.

An eight gates type CSA unit UN1 is, in general, constituted by eight AND gates as shown in FIG. 5. In FIG. 5, $\alpha$, $\beta$, and $\gamma$ represent inputs to the UN1; S and C represent outputs from the CSA unit UN1; and minus marks indicate turnover input and turnover output.

Based on the inputs and outputs shown in FIG. 5, a logic table is as represented by the following table 1.

TABLE 1

| gate number | input | | | output | | corresponding gate number |
|---|---|---|---|---|---|---|
| of UN1 | α | β | γ | C | S | of UN2 |
| 0 | 0 | 0 | 0 | 0 | 0 | a |
| 1 | 0 | 0 | 1 | 0 | 1 | b |
| 2 | 0 | 1 | 0 | 0 | 1 | c |
| 3 | 0 | 1 | 1 | 1 | 0 | c |
| 4 | 1 | 0 | 0 | 0 | 1 | d |
| 5 | 1 | 0 | 1 | 1 | 0 | e |
| 6 | 1 | 1 | 0 | 1 | 0 | f |
| 7 | 1 | 1 | 1 | 1 | 1 | f |

Figure 6:
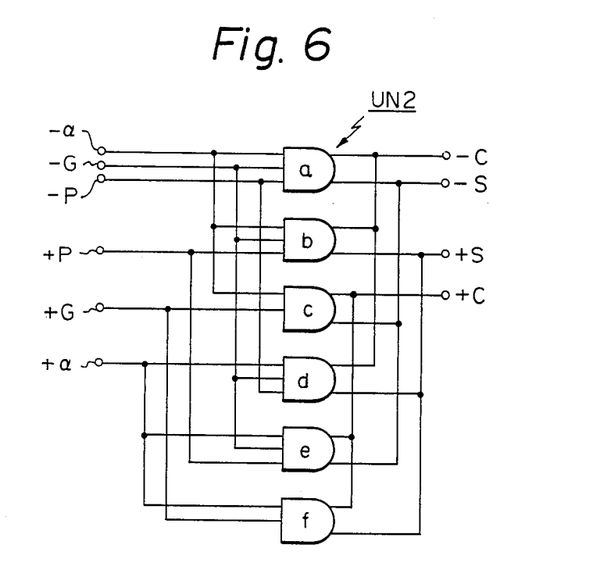
FIG. 6 is a basic circuit diagram of a unit of the CSA tree having six AND gates according to an embodiment of the present invention.

Meanwhile, a six gates type CSA unit UN2 according to the present invention is constituted by six AND gates as shown in FIG. 6. In FIG. 6, $\alpha$, G, and P represent inputs looped back from the G/P unit 20 and transmitted from the CSA tree 14. S and C represent outputs from the CSA unit.

Based on the inputs and outputs shown in FIG. 6, a logic table is as represented by the following table 2.

TABLE 2

| gate number | inputs | | | outputs | |
|---|---|---|---|---|---|
| | α | G | P | C | S |
| a | 0 | 0 | 0 | 0 | 0 |
| b | 0 | 0 | 1 | 0 | 1 |
| c | 0 | 1 | X | 1 | 0 |
| d | 1 | 0 | 0 | 0 | 1 |
| e | 1 | 0 | 1 | 1 | 0 |
| f | 1 | 1 | X | 1 | 1 |

As shown in FIG. 4, and formulas (1) and (2), since the generated term $G_i$ is formed by the AND gate and the propagated term $P_i$ is formed by the OR gate, when $G_i$ is equal to "1", $P_i$ is always equal to "1", because $A_i$ and $B_i$ are equal to "1". Accordingly, in Table 1, since $\beta$ corresponding to G is represented by "1" at the number 2 and 3 gates, $\gamma$ corresponding to P is equal to "1", so that the number 2 and 3 gates are concentrated to the number "c" gate in Table 2. Similarly, the number 6 and 7 gates in Table 1 are concentrated to the number "f" gate in Table 2. Consequently, two gates are eliminated by using the generated term $G_i$ and the propagated term $P_i$ as inputs to the CSA tree 15'.

Figure 7:
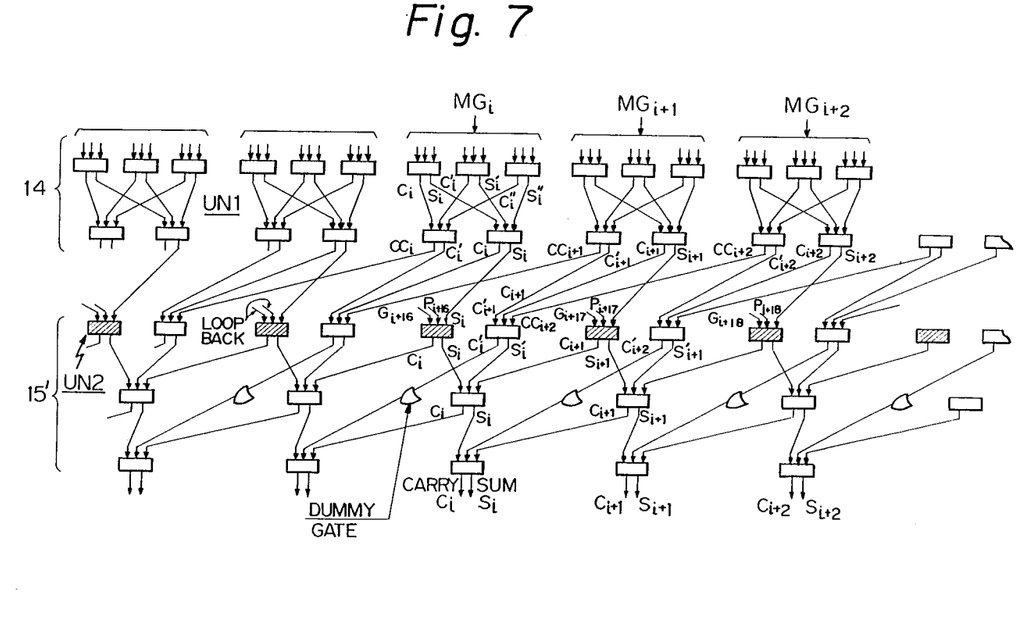
FIG. 7 is a basic block diagram of CSA trees according to an embodiment of the present invention.

In FIG. 7, the CSA tree 14 is constituted by a plurality of UN1's and the CSA tree 15' is constituted by a plurality of UN1's and UN2's. In the drawing, UN2 is indicated by the hatched boxes. As can be understood from the drawing, nine inputs (3 units×3 inputs=9 inputs) transmitted from the multiple gate 13 are changed to four outputs (cc, c', c and s) in the CSA tree 14. Where cc indicates the output of the next carry. Meanwhile, three inputs (G, P and $\alpha$) transmitted from the G/P unit and the CSA tree 14 are applied to the UN2 in the CSA tree 15'. Accordingly, since one UN2 per nine inputs (i.e. per one bit) is used in the CSA tree 15', two gate circuits per nine inputs are eliminated in the CSA tree 15'. As can be understood from FIGS. 5, 6, and 7, if all CSA units are used with the UN1, there is an increase of two gate circuits per nine inputs in the CSA tree 15'.

Two outputs, i.e., sum S and carry C, obtained by the CSA tree 15' are applied to the G/P unit 20 through the registers 16 and 17. The outputs of the G/P unit 20, i.e., the generated term $G_i$ and the propagated term $P_i$, are applied to the carry look ahead logic CLA 21 and the half sum logic HS 22 in parallel with the loop back to the CSA tree 15' after conversion to the generated term G and the propagated term P by the G/P unit 20.

As mentioned above, the loop backs to the CSA tree 15' are performed by the generated term $G_i$ and the propagated term $P_i$, thereby making it possible to reduce the number of gate circuits in the CSA unit and to improve the operation speed of the multiplication circuit. Moreover, although the output gates 18 and 19 are eliminated in the multiplier 1, the G/P unit 20 can function as a high power gate instead of the output gates 18 and 19, because the G/P unit is constituted by the AND gate and the OR gate as explained in FIG. 4.

Figure 8:
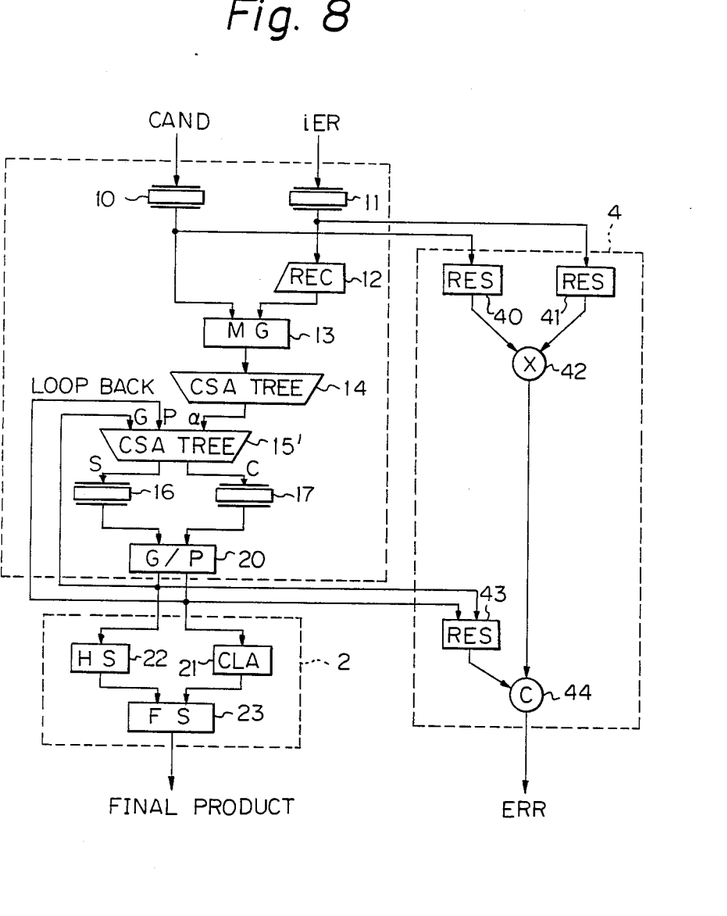
FIG. 8 is a basic diagram of an error check circuit provided to the multiplication circuit shown in FIG. 3.

In FIG. 8, an error check circuit 4 according to an embodiment of the present invention is constituted by a residue generator 40 for generating a residue based on the CAND, a residue generator 41 for generating a residue based on the iER, a residue multiplier 42 for multiplying both residues transmitted from both residue generators 40 and 41, a residue generator 43 for generating a residue based on the generated term $G_i$ and the propagated term $P_i$ transmitted from the G/P unit 20, and a residue comparator 44 for generating an error ERR based on comparison of a residue obtained by the residue multiplier 42 with a residue obtained by the residue generator 43.

As is obvious from the drawing, an error check according to the present invention is performed by comparing the residues obtained from the CAND and iER with the residues obtained from the generated term $G_i$ and propagated term $P_i$.

The error check operation according to the present invention will be explained in detail by using, as an example, four bits addition.

Figure 9A:
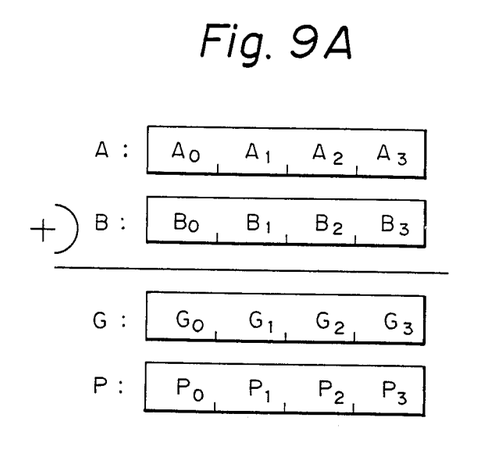
FIG. 9A is a table explaining the relationship between inputs A, B and outputs G, P based on the formulas (1) and (2)
Figure 9B:
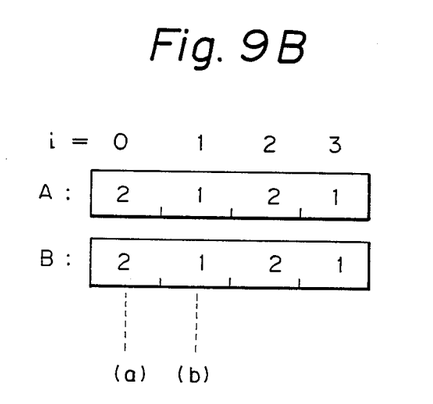
FIG. 9B is a table explaining the relationship between bit number and residues of inputs A, B.

In FIGS. 9A and 9B, the relationship between inputs A, B and outputs G, P is represented as shown in FIG. 9A by referring to formulas (1) and (2). Each residue of the inputs A and B can be obtained based on one value weighted by multiplying each odd bit (i=1, 3) by "1", and based on the other value weighted by multiplying each even bit (i=0, 2) by "2". Accordingly, the residue, for example, when both inputs A and B are equal to "1", is shown in FIG. 9B. As can be understood from FIG. 9B, there are two residue groups, i.e., A and B equal to "2" (a), and A and B equal to "1" (b), at the same bit number. The former is in the case of an even bit and the latter is in the case of an odd bit.

Meanwhile, regarding each residue of G and P, in the case of an even bit as shown (a) in FIG. 9B, the residue RES ($G_0$) when $G_0$ is equal to "1" and the residue RES ($P_0$) when $P_0$ is equal to "1" are represented by the following formulas.

$$RES(G_0) = RES(2 + 2) \quad (3)$$

$$= RES(1)$$

$$RES(P_0) = RES(2 + 0) \quad (4)$$

$$= RES(2)$$

In formula (3), when $G_0$ is equal to "1", i.e., $A_0$ and $B_0$ are equal to "1", the residue RES ($G_0$) can be obtained by RES (2+2) which adds the residue "2" to the residue "2". Since RES (2+2) is equal to RES (4), RES (1) can be obtained by dividing RES (4) by "3", as shown in formula (1).

In formula (4), when $P_0$ is equal to "1", i.e., either $A_0$ or $B_0$ is equal to "1", the residue RES ($P_0$) can be obtained by RES (2+0) which adds the residue "2" to the residue "0" ("0" is obtained by multiplying "0" by "2"). Consequently, the residue RES ($P_0$) is equal to RES (2+0), as shown in formula (4).

In the case of an odd bit as shown by (b) in FIG. 9B, the residue RES ($G_1$) when $G_1$ is equal to "1" and the residue RES ($P_1$) when $P_1$ is equal to "1" are represented by the following formulas.

$$RES(G_1) = RES(1 + 1) \quad (5)$$

$$= RES(2)$$

$$RES(P_1) = RES(1 + 0) \quad (6)$$

$$= RES(1)$$

In formula (5), as in formula (3), the residue RES ($G_1$) can be obtained by RES (2) which adds the residue "1" to the residue "1", and the residue RES ($P_1$) can be obtained by RES (1) which adds the residue "1" to residue "0".

Although the explanations herein refer to $G_0$, $P_0$, $G_1$ and $P_1$ as being equal to "1", when $G_0$, $P_0$, $G_1$, and $P_1$ are equal to "0", any residue is equal to RES (0).

Accordingly, the residues represented by the following tables are obtained from the G/P unit. Tables 3 represents the RES when "i" is bit number "0" and the Table 4 represents the RES when "i" is bit number "1".

TABLE 3

| $G_0$ | $P_0$ | RES | |
|---|---|---|---|
| 0 | 0 | 0 | |
| 0 | 1 | 2 | obtained by formula (4) |
| 1 | X | 1 | obtained by formula (3) |

TABLE 4

| $G_1$ | $P_1$ | RES | |
|---|---|---|---|
| 0 | 0 | 0 | |
| 0 | 1 | 1 | obtained by formula (6) |
| 1 | X | 2 | obtained by formula (5) | where, X is used for indicating that this number is unnecessary since $P_0$ and $P_1$ are always "1" when $G_0$ and $G_1$ are "1", based on formulas (1) and (2). The same table as shown in Table 3 is adapted to $G_2$ and $P_2$ when "i" is bit number "2", and the same table as shown in Table 4 is adapted to $G_3$ and $P_3$ when "i" is bit number "3".

A concentrated table from Table 3 and Table 4 is shown below.

TABLE 5

| $G_0$ | $P_0$ | $G_1$ | $P_1$ | RES | GATE No. |
|---|---|---|---|---|---|
| 0 | 0 | 0 | 0 | 0 | 1 |
| 0 | 0 | 0 | 1 | 1 | 2 |
| 0 | 0 | 1 | X | 2 | 3 |
| 0 | 1 | 0 | 0 | 2 | 4 |
| 0 | 1 | 0 | 1 | 0 | 5 |
| 0 | 1 | 1 | X | 1 | 6 |

TABLE 5-continued

| $G_0$ | $P_0$ | $G_1$ | $P_1$ | RES | GATE No. |
|---|---|---|---|---|---|
| 1 | X | 0 | 0 | 1 | 7 |
| 1 | X | 0 | 1 | 2 | 8 |
| 1 | X | 1 | X | 0 | 9 |

Figure 10:
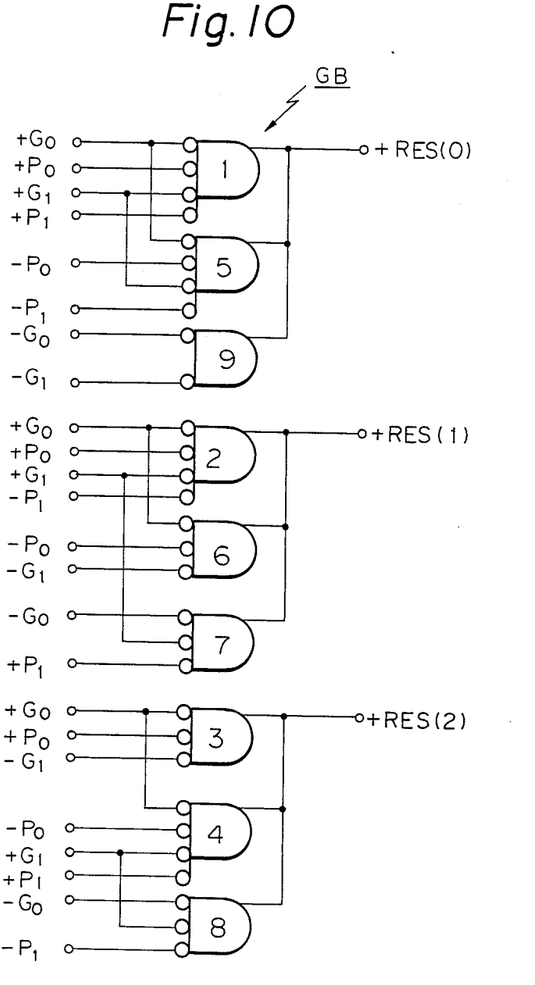
FIG. 10 is a basic circuit diagram of a gate block according to the present invention.
Figure 11A:
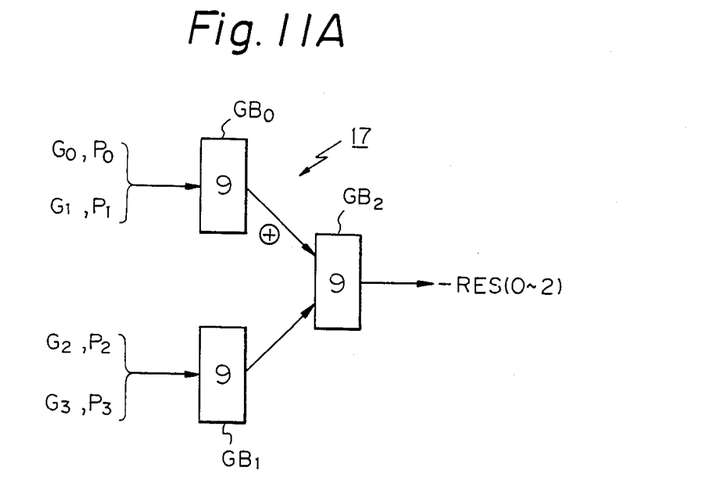
FIG. 11A is a basic block diagram of a residue generator 43 shown in FIG. 8 in the case of four bits inputs.

In FIG. 10, this gate block GB is used in the residue generator 43 shown in FIG. 8. The residue generator 43 in the case of four bits inputs of A and B is constituted by three gate blocks $GB_0$ to $GB_2$, as shown in FIG. 11A. The gate block GB is constituted by nine AND gates.

As is obvious from Table 5, when RES (0), since $G_0$, $P_0$, $G_1$ and $P_1$ are indicated by 0 0 0 0, 0 1 0 1 and 1 X 1 X, the RES (0) can be obtained by the outputs of three gates Nos. 1, 5, and 9 as shown in FIG. 10. Similarly, when RES (1), since $G_0$, $P_0$, $G_1$ and $P_1$ are indicated by 0 0 0 1, 0 1 1 X and 1 X 0 0, the RES (1) can be obtained by the outputs of three gates Nos. 2, 6, and 7. Moreover, when RES (2), since $G_0$, $P_0$, $G_1$ and $P_1$ are indicated by 0 0 1 X, 0 1 0 0 and 1 X 0 1, the RES (2) can be obtained by the outputs of three gates Nos. 3, 4, and 8.

Figure 11B:
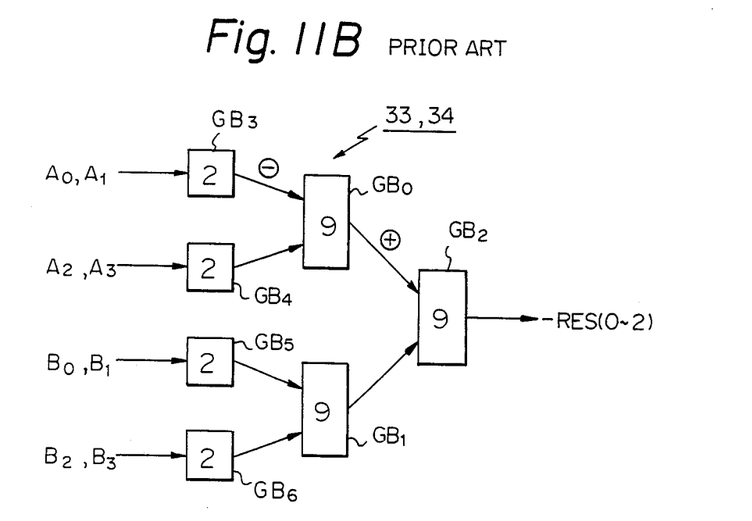
FIG. 11B is a basic block diagram of conventional residue generators 33 and 34 shown in FIG. 2; and, FIG. 12 is a basic block diagram of another error check circuit provided to the multiplication circuit shown in FIG. 3.

As mentioned above, in the case of a four bits inputs of A and B as shown in FIG. 9A, the residue generator 43 comprises three gates blocks $GB_0$ to $GB_2$ shown in FIG. 11A, each of which comprises nine AND gates as shown in FIG. 10. While, the conventional residue generators 33 and 34 comprise three gate blocks $GB_0$ to $GB_2$ having nine AND gates per unit and four gate blocks $GB_3$ to $GB_6$ having two AND gates per unit shown in FIG. 11B. Two AND gate blocks are used as inputs to each nine AND gate block. Accordingly, in the case of four bits inputs of A and B, conventional residue generators 33 and 34 need thirty five gates (two AND gates X 4, and nine AND gates X 3). While, the residue generator 43 according to the present invention need only twenty seven gates (nine AND gates X 3).

Consequently, in the error check circuit 4 according to the present invention, it is possible to reduce the number of gate circuits by using the generated term $G_i$ and propagated term $P_i$ transmitted from the G/P unit 20.

Figure 12:
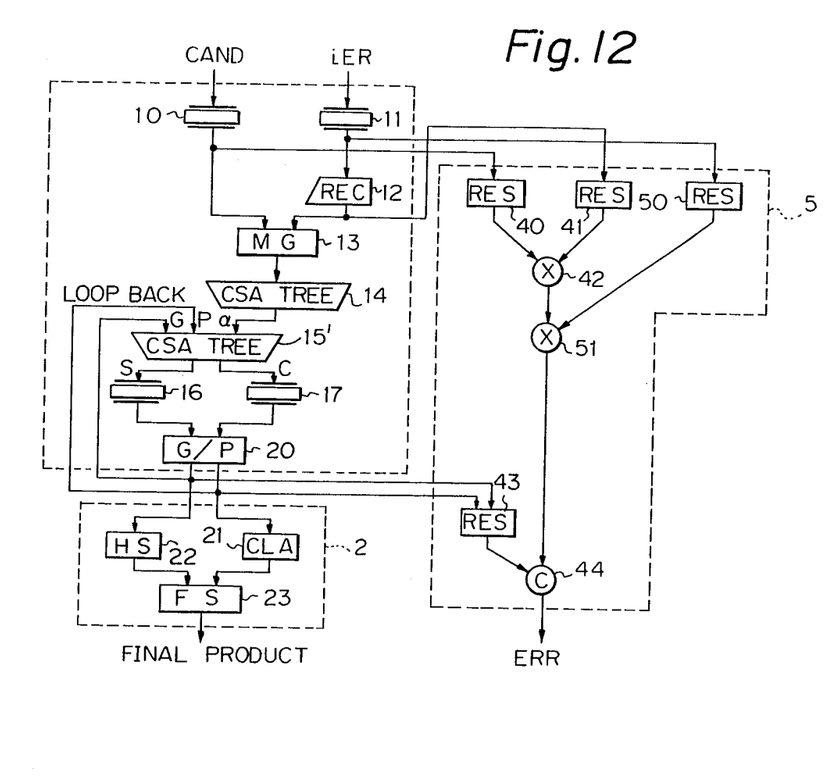

In FIG. 12, in an error check circuit 5 according to another embodiment of the present invention, a detector 50 and a residue multiplier 51 are added to the error check circuit 4 shown in FIG. 8. Moreover, an input to the detector is applied from the iER, and an input to the residue generator 41 is applied from the recoder 12. The detector 50 functions as an all "0" detector, i.e., if the iER is all "0", the detector 50 detects this all "0". This all "0" is multiplied by the output of the residue multiplier 42. The following operation is the same as that shown in FIG. 8, and a description thereof is omitted.

What is claimed is:

1. A multiplication circuit used for a high speed multiplication in a computer system, said multiplier circuit comprising:

a multiplier including carrying save adder trees having a plurality of carry save adders for obtaining a sum and carry for a binary number, said carry save adder trees including at least a first stage carry save adder tree and a final stage carry save adder tree, and generation/propagation unit for generating a carry generation function and a carry propagation function based on said sum and carry, said carry generation function and said carry propagation function are fed back to said final stage carry save adder tree; and a carry propagating adder for obtaining a final product based on said carry generation function and said carry propagation function.

2. A multiplication circuit as claimed in claim 1, wherein said multiplier comprises a first register for storing a multiplicand, a second register for storing a multiplier factor, a recoder for recoding said multiplier factor, a multiple gate for determining a scale factor based on outputs of said first register and said recoder, said first stage carry save adder tree for obtaining sum and carry based on outputs of said recoder, said final stage carry save adder tree for obtaining sum and carry based on outputs of said first stage carry save adder tree and said generation/propagation unit.

3. A multiplication circuit as claimed in claim 2, wherein said circuit further comprises an error check circuit constituted by a first residue generator for generating a residue based on said multiplicand, a second residue generator for generating a residue based on said multiplier factor from said recoder, a first residue multiplier for multiplying both residues transmitted from said first and second residue generators, a third residue generator for generating a residue based on said carry generation function and carry propagation function, a detector for detecting said multiplier factor from said first register, a second residue multiplier for multiplying outputs of said first residue multiplier by an output of said detector and a residue comparator for generating an error based on comparison of said residue obtained from said second residue multiplier with said residue obtained from said third residue generator.

4. A multiplication circuit as claimed in claim 3, wherein said detector comprises an all-zero detector.

5. A multiplication circuit as claimed in claim 3, wherein said residue comparator generates an error check of said error check circuit by comparing a residue obtained from said second residue multiplier with residues obtained from said residue generator based on said carry generation function and said carry propagation function.

6. A multiplication circuit as claimed in claim 2, wherein said circuit further comprises an error check circuit constituted by a first residue generator for generating a residue based on said multiplicand, a second residue generator for generating a residue based on said multiplier factor, a first residue multiplier for multiplying both residues transmitted from said first and second residue generators and, a third residue generator for generating a residue based on said carry generation function and carry propagation function, and a residue comparator for generating an error based on comparison of said residue obtained by said first residue multiplier with said residue obtained by said third residue generator.

7. A multiplication circuit as claimed in claim 6, wherein said residue comparator generates an error check of said error check circuit by comparing (a) residues obtained from said residue multiplier based on said multiplicand and multiplier factor with (b) residues obtained from said third residue generator based on said carry generation function and said carry propagation function.

8. A multiplication circuit as claimed in claim 1, wherein said first stage carry save adder tree comprises a plurality of carry save adders, each of which comprises an eight AND gate circuit.

9. A multiplication circuit as claimed in claim 1, wherein said final stage carry save adder tree comprises a plurality of two kinds of carry save adders, one kind of carry save adder comprising an eight AND gate circuit, the other kind of carry save adder comprising a six AND gate circuit.

10. A multiplication circuit as claimed in claim 1, wherein said generation/propagation unit is a high power gate.

* * * * *